United States Patent [19]

Orphan

[11] Patent Number: 5,215,345
[45] Date of Patent: Jun. 1, 1993

[54] PROTECTIVE COVER FOR CARGO AREA OF A STATION WAGON

[76] Inventor: Angelo A. Orphan, 109 Puesta Del Sol, Los Gatos, Calif. 95030

[21] Appl. No.: 901,924

[22] Filed: Jun. 22, 1992

[51] Int. Cl.⁵ ............................................. B62D 25/00
[52] U.S. Cl. .................................. 296/39.1; 296/37.16
[58] Field of Search ...................... 296/39.1, 37.16, 76, 296/24.2

[56] References Cited

U.S. PATENT DOCUMENTS

| | | | |
|---|---|---|---|
| 2,898,146 | 8/1959 | Yudenfreund | 296/39.1 |
| 2,911,253 | 11/1959 | Dewey | 296/39.1 |
| 3,653,710 | 4/1972 | Barnard | 296/39.1 |
| 4,877,281 | 10/1989 | Altman | 296/39.1 |
| 4,943,105 | 7/1990 | Kacar et al. | 296/24.2 |

Primary Examiner—Robert R. Song
Attorney, Agent, or Firm—Robert Charles Hill

[57] ABSTRACT

A cover for the floor and walls of the cargo area of a vehicle including a substantially rectangular area for covering the floor, a forward extension having two sections, each one extending over one of the backs of the rear seats and sidewall extensions. Adjacent edges of the two forward sections may be joined by a zipper. The zipper may be open to permit the back of one rear seat to be vertically up and the other back horizontally down. Alternatively, when both backs are either up or down, the zipper may be closed providing additional protection to the underlying upholstery of the vehicle. The padded cover over the rear door is separate from the rest of the cover.

10 Claims, 2 Drawing Sheets

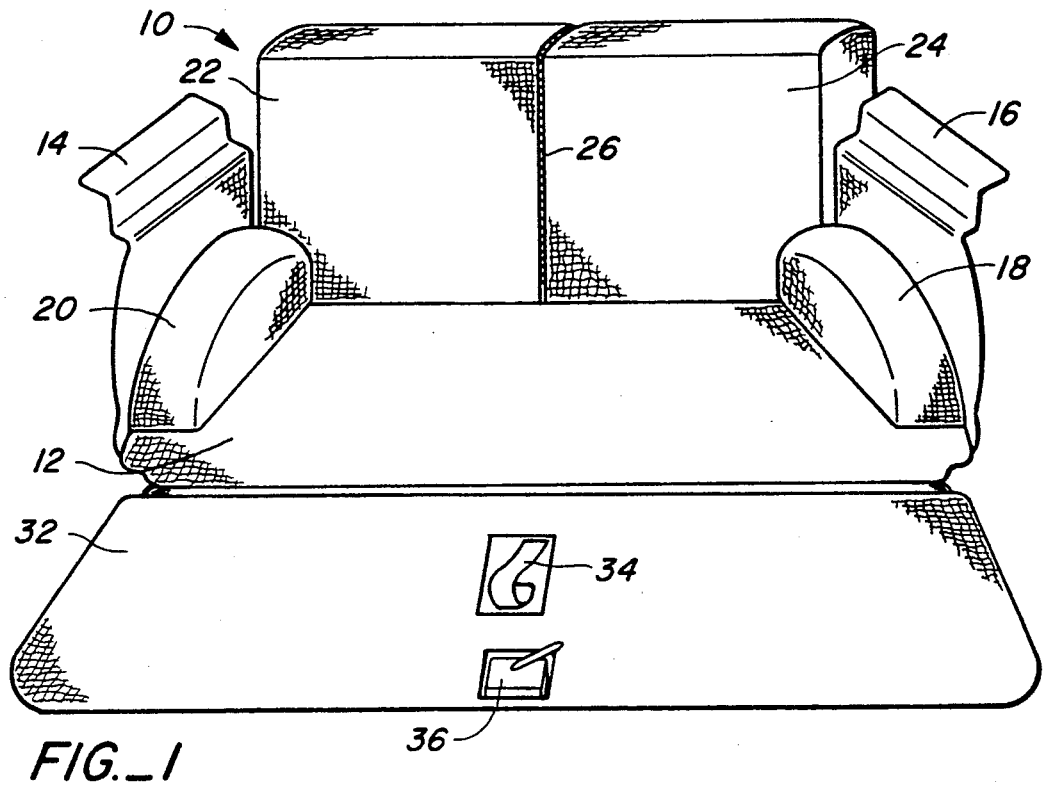
FIG._1
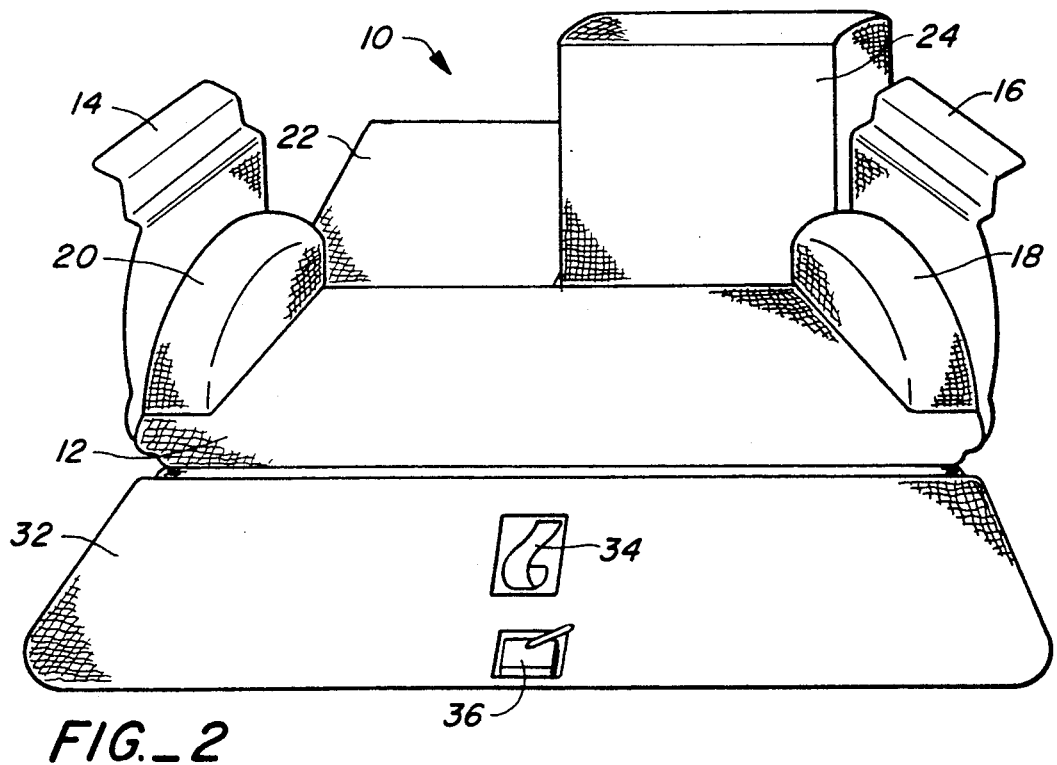
FIG._2

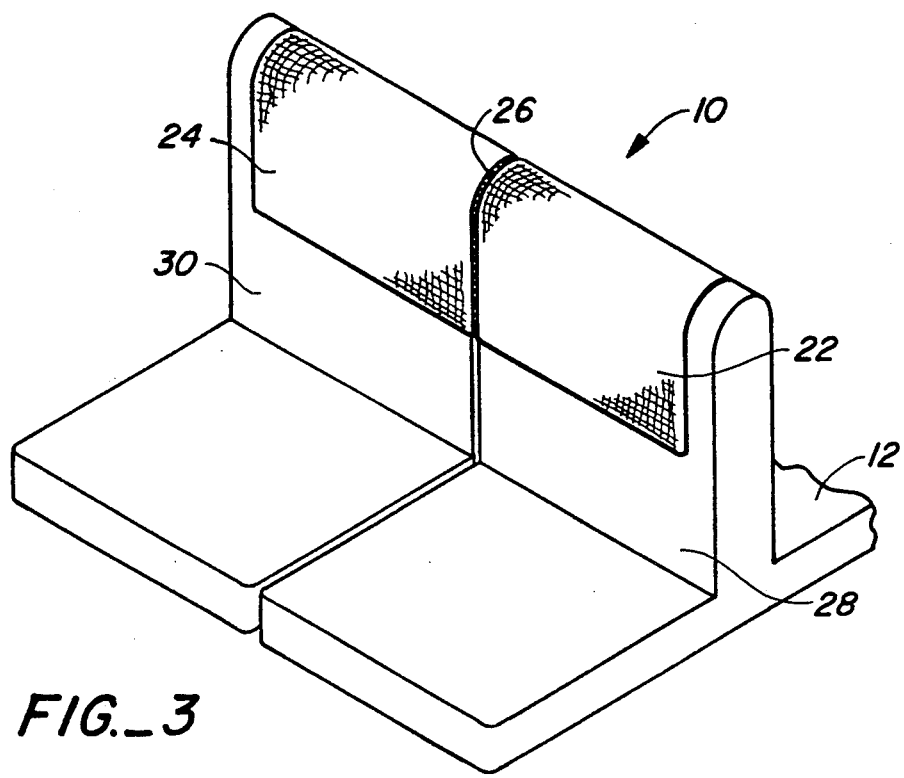
FIG._3
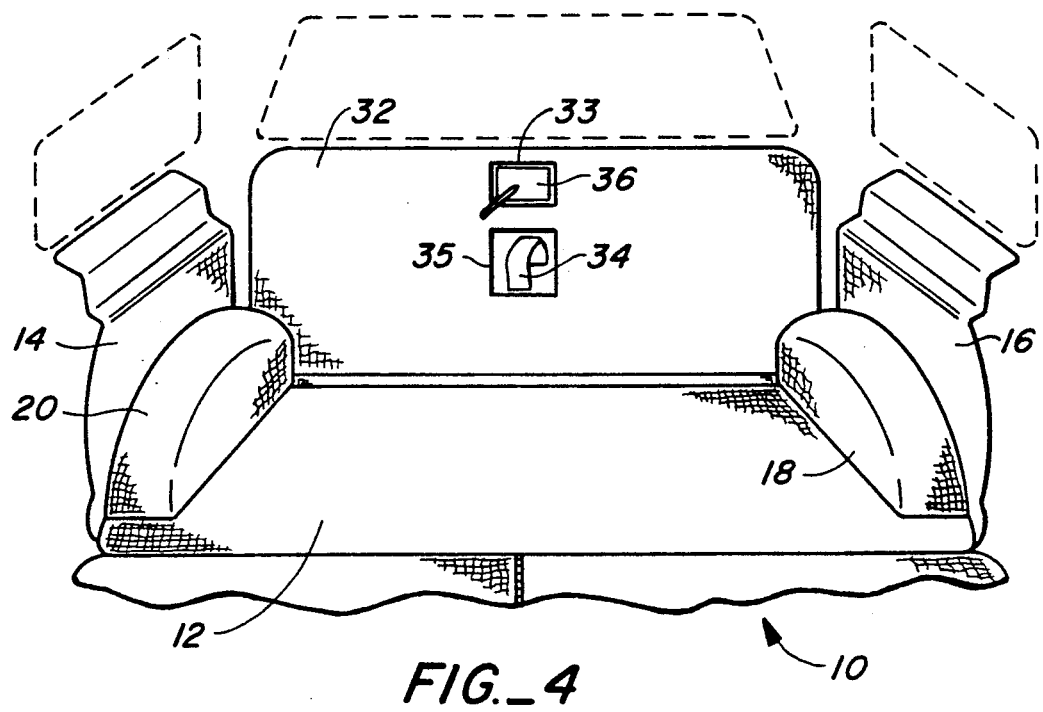
FIG._4

PROTECTIVE COVER FOR CARGO AREA OF A STATION WAGON

BACKGROUND

1. Field of the Invention

This invention relates to covers for the cargo areas of station wagons and particularly to a cover that is readily installed or removed and suitable for transporting pets.

2. Prior Art and Information Disclosure Statement

In most families, it is desirable that a station wagon perform in a number of different roles. In one role, it is a limousine that transports the family to affairs in which situation the owner desires to present the vehicle in as "dressy" a light as possible. In another role, it may be required to perform the duties of truck such as transporting bags of compost home from the garden nursery. In yet another role, it may be required to transport the family dog. In response to these requirements, automobile designers have developed station wagon interiors which can be converted to several different configurations. The Ford Explorer is one example of a vehicle with a convertible interior. In one configuration, the vehicle is a "four seater" with two separate front seats and two separate rear seats with a relatively small space (cargo area) in back of the rear seats for storing suitcases, etc. This configuration is suitable for transporting the family. It may also be large enough to transport the family dog or one or more children. In another configuration, one or both of the rear seats may be folded forward so that the back of one or both of the rear seats is part of a larger platform that includes the rear cargo area of the car. Continued use of the cargo area for the purpose of transporting pets, or items such as bags of garden supplies results in soiling and wear of the upholstery or fabric lining.

To minimize wearing or soiling the upholstery, wagon owners sometimes spread a cover over the cargo area. For example, the Hatchbag is a liner that lays loosely over the floor of the cargo area of the 4×4 station wagon and extends up the sidewalls and rear of the back seat. The cover is attached to the upholstery with velcro. The cover is made to fit or protect the cargo area only when the rear seats are in the vertically up position and does not accomodate the situation where one or both the rear seats are horizontally down. Furthermore, the cover does not protect against injury to the pet or child that can occur if the child or pet is thrown against the interior fenders or rear door by sudden turns of the vehicle.

THE INVENTION

Objects

It is an object of this invention to provide an improved cover for the cargo area of a station wagon.

Another object is to provide a cover that is accomodated to a vehicle having two rear seats, one or both of whose backs may be vertically up or horizonatally down.

Another object is to prevent injury to a pet or child riding in the cargo area that can result from sudden turns of the vehicle.

Another object is to prevent spilled liquids from wetting and staining the original upholstery underlying the cover.

Another object is to configure the cover so as to maintain accessibility to the door handles, window handles, etc.

Another object is to provide convenient installation or removal of the cover of this invention.

SUMMARY

This invention is directed toward a cover for the cargo area of a station wagon which lays over the floor of the cargo area, has padded extensions over the interior surfaces of the rear fenders and has an extension up and over the backs of the two rear seats. The extension over the backs of the rear seats has two separate areas, one area covering one seat back and the other area covering the other seat back. The adjacent edges of the areas may be joined by a zipper providing that either one seat back may be in the up position and the other may be in the down position with the zipper open or both seat backs may be in the up or down position with the zipper closed. The extensions over the top interior surfaces of the fenders are padded to avoid injury to a child or pet that might otherwise result from being thrown against the fenders because of a sudden turn. Another padded cover section is separately attached over the inside surface of the rear door. Cutouts are provided in appropriate areas for access to window and door handles. The cover is maintained in position by underlying velcro patches that attach to the nap of the original fabric of the vehicle. The under side of the cover is lined with urethane thereby preventing penetration of accidentally spilled liquids to the original fabric of the vehicle.

DRAWINGS

FIG. 1 is a perspective view of the cover of this invention viewed forward from the rear of the vehicle.

FIG. 2 is a perspective view identical to FIG. 1 but with one of the backs of the rear seats horizontally down.

FIG. 3 shows the covers draped over the rear seats.

FIG. 4 shows the cover section over the rear door.

DESCRIPTION OF THE BEST MODE

Turning now to a description of the drawings, FIG. 1 shows in perspective the cover 10 of this invention in the cargo area of a vehicle viewed in the forward direction from the rear end of the vehicle. In FIG. 1, the rear door of the vehicle is down and the backs of the two rear seats are vertically up. FIG. 2 is identical to FIG. 1 except that the back 22 of one seat is down. There are shown the floor section 12 and the extensions 14 and 16 over the sidewalls of the vehicle. The sections, 18 and 20, of the sidewall extensions are padded for the protection of pets or children that may be riding in the cargo area. The extension over the backs of the rear seats has area 22 over the back of one rear seat and area 24 over the back of the other rear seat. The adjacent edges of the areas, 22 and 24, are joined by a zipper 26. When the zipper is open, either back of the rear seats may be down with the other back up as shown in FIG. 2. When both seat backs are down, the zipper may be closed to secure coverage over the additional floor space provided by the backs of the seats.

FIG. 3 is a view looking rearward showing that the areas 22 and 24 extend over the front surfaces 28 and 30 of the rear seats respectively.

FIG. 4 shows a separate section 32 of the cover that covers the rear door. Cover cutouts 33 and 35 provide accessibility to pullup strap 34 and door lock 36.

The cover is maintained in position by "hook and eye" (velcro) patches (not shown) permanently attached to the frame of the car and on the topside of the fenders. Additional patches are secured under appropriate areas of the cover such as area 22 and area 24 providing that these areas may be detachably secured to the upholstery of the vehicle.

Although the cover may be made of a number of fabrics or plastic sheet, a preferred material is nylon fabric such as Cordura manufactured by Dupont. The underside of the fabric is coated with urethane to provide water resistance and prevent spilled liquids from reaching the original upholstery of the vehicle.

In the foregoing paragraphs, an embodiment has been described which meets the objects of the invention. The crux of the invention is a cover for the cargo area of a vehicle that has a two part extension with adjacent edges joined by a zipper. Each part lies over the respective back of the rear seats such that, when both backs are up or down, the zipper may be closed to provide protection of the upholstery of the backs and when the zipper is opened, either rear seat may be up or down when the other seat is down or up thereby providing additional protected floor space to the cargo area. Certain areas of the cover are padded such as over the fenders and the rear door. Other variations to the invention are possible such as padding over the entire sidewalls, different material, etc., all of which are within the scope of the invention. I therefore wish the scope of my invention to be defined by the attached claims.

I claim:

1. A cover for the cargo area of a vehicle having a substantially rectangular floor area bounded by two opposing side floor edges and a forward floor edge with two rear seats adjacent to said forward floor edge, said cover comprising:

a floor section substantially rectangular and bounded by a forward cover edge opposite a rear cover edge and between first and second side edges;

two forward sections, side by side, each having an edge bounded by said forward cover edge and each forward section having a zippered edge; and a zipper means operably arranged for detachably joining two said zippered edges together providing that said cover is allowed to be positioned on said floor area with said forward cover edge adjacent to said forward floor edge and each said forward section extended over a respective back of one of said rear seats such that, when said zipper means is open, either one of said backs is able to be vertical while said other back is horizontal and when both said seats are vertical or horizontal, said zipper means is allowed to be closed.

2. A cover as in claim 1 which comprises hook and eye patch means under said forward sections for securing said forward sections in position on said rear seats.

3. A cover as in claim 1 wherein each said forward section extends over a front surface of said respective rear seat.

4. A cover as in claim 1 wherein said cargo area includes a side wall and fender on one of each floor side edges and said cover comprises two side sections, each one side section having an edge attached to one of said cover side edges respectively and each side section contoured to extend over said respective side wall and fender.

5. A cover as in claim 4 wherein said side section has a fender area extending over said fender and said fender area is padded.

6. A cover as in claim 1 wherein said cargo area is bounded by a rear door opposite said forward floor edge and said cover comprises a rear door cover section.

7. A cover as in claim 6 wherein said rear door cover section is padded.

8. A cover as in claim 6 wherein said rear door includes a lock and handle, and said rear door cover section comprises cutouts operably configured to provide accessibility to said lock and handle.

9. A cover as in claim 1 wherein said cover comprises nylon.

10. A cover as in claim 9 wherein said cover comprises urethane plastic lining under said nylon thereby preventing liquid from penetrating said cover.

* * * * *